April 12, 1932. G. E. LAND 1,853,363
BASE FOR PLASTIC MATERIALS
Filed May 23, 1927  4 Sheets-Sheet 1
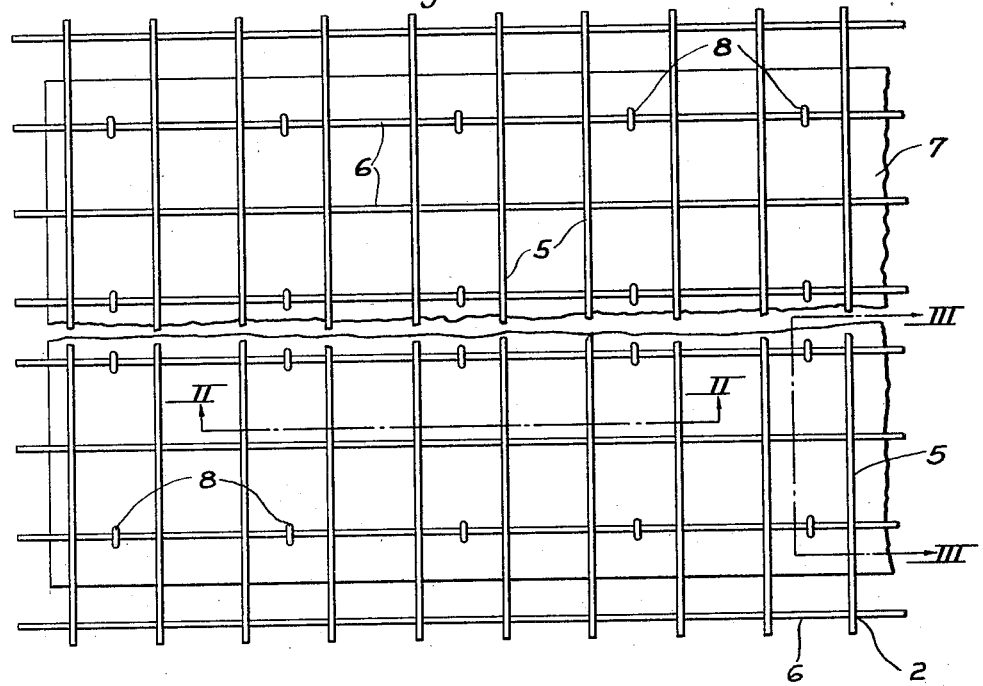
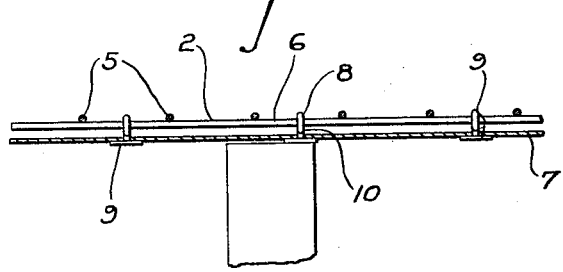
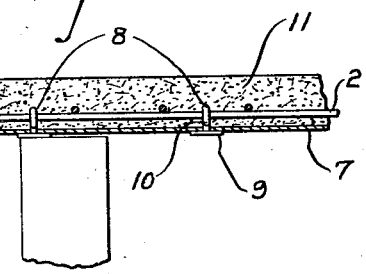
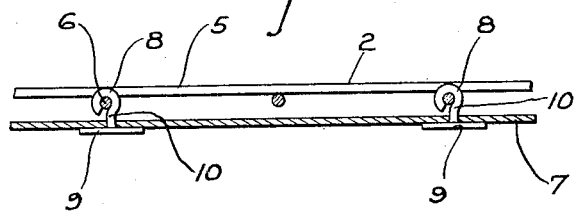
INVENTOR
George Elmer Land,
By Byrnes, Stebbins & Parmelee
His attorneys.

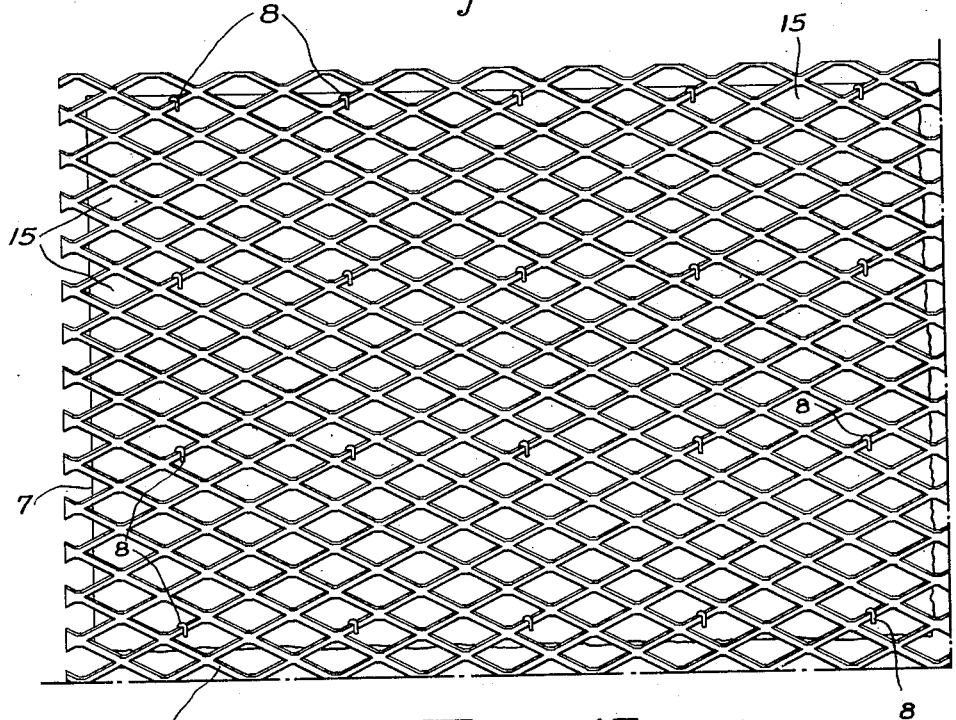
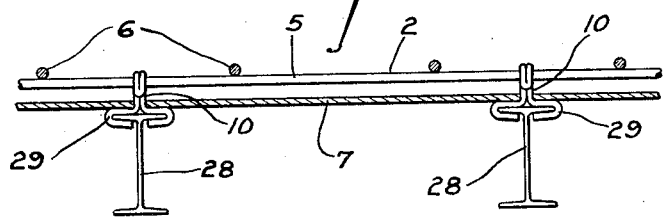
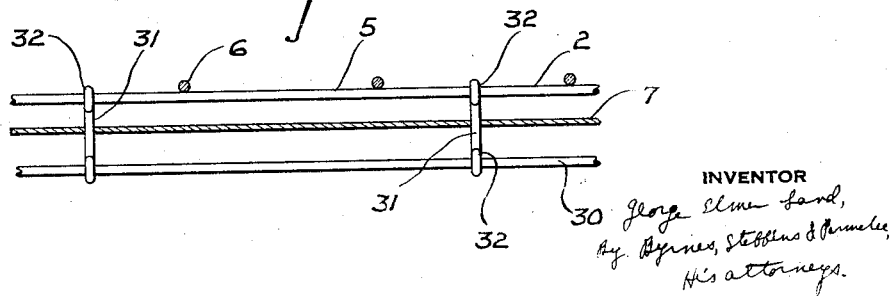

April 12, 1932.  G. E. LAND  1,853,363
BASE FOR PLASTIC MATERIALS
Filed May 23, 1927    4 Sheets-Sheet 3
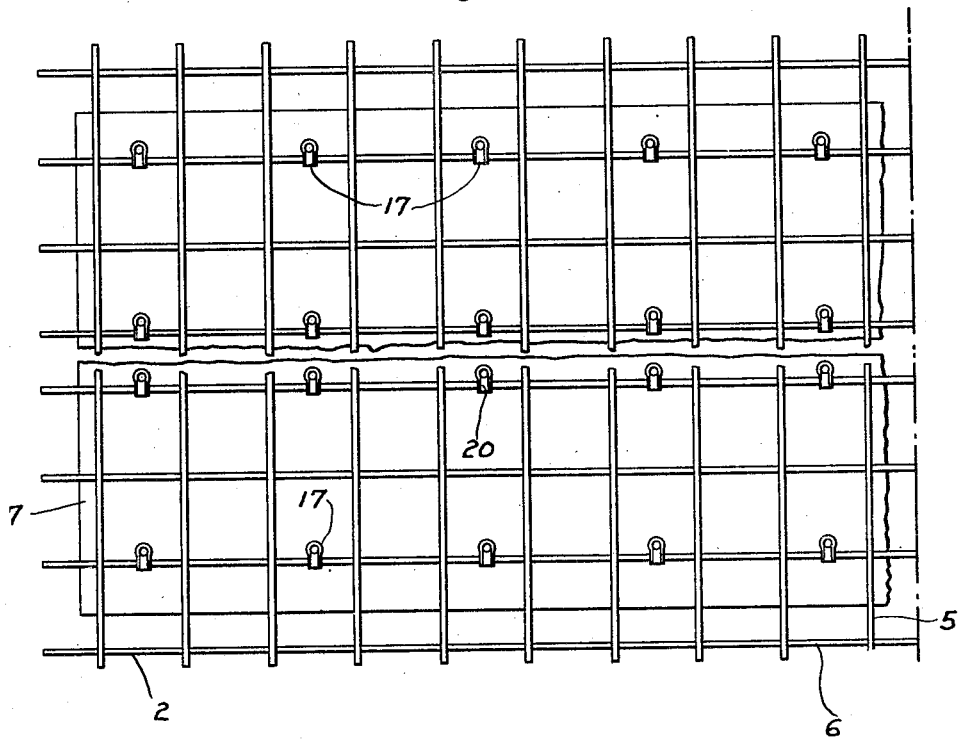
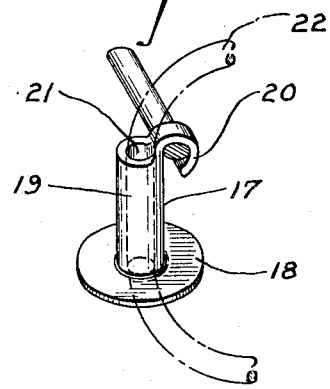
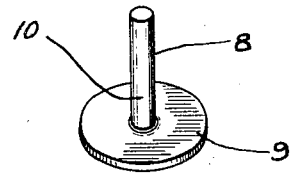
INVENTOR April 12, 1932.  G. E. LAND  1,853,363
BASE FOR PLASTIC MATERIALS
Filed May 23, 1927   4 Sheets-Sheet 4
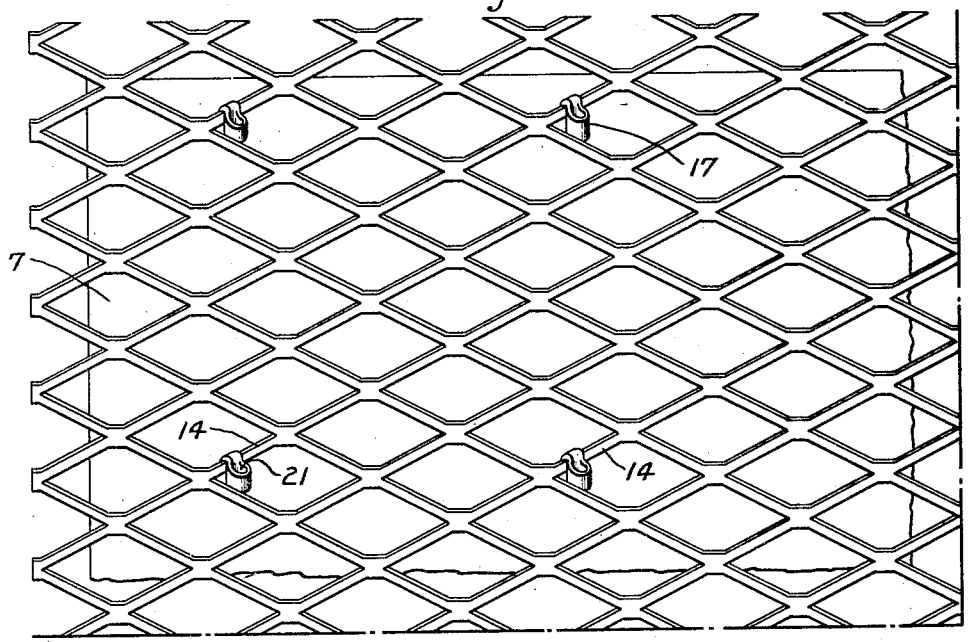
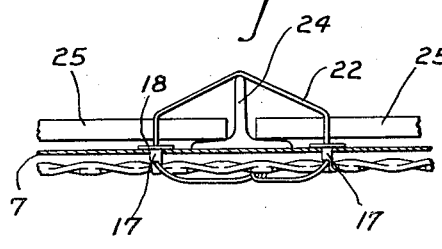
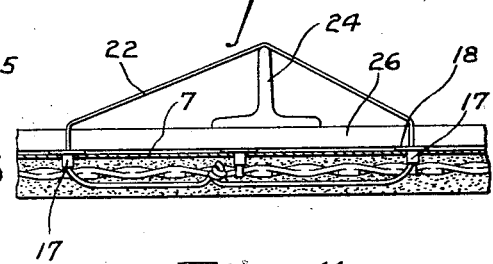
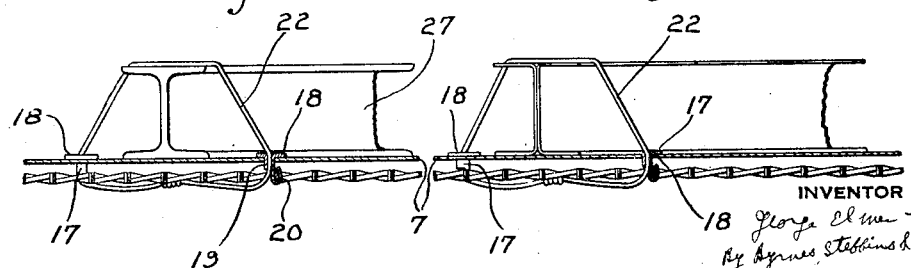
INVENTOR
George Elmer Land,
By Agnes Stebbins & Parmelee
his attorneys.

Patented Apr. 12, 1932

1,853,363

UNITED STATES PATENT OFFICE

GEORGE ELMER LAND, OF PITTSBURGH, PENNSYLVANIA, ASSIGNOR, BY MESNE ASSIGNMENTS, TO MARY HAINES MARKS, OF SEWICKLEY, PENNSYLVANIA

BASE FOR PLASTIC MATERIALS

Application filed May 23, 1927. Serial No. 193,451.

My invention relates to bases for plastic materials and more particularly to a method and apparatus for securing a backing sheet of metal, wood, paper or other material to a reticulated metallic fabric of perforated, woven, welded or other construction. Bases for plastic materials are principally for the purpose of retaining, reinforcing, or acting as a form for plastic materials, and incidentally to provide fireproofing, sound-deadening, waterproofing, insulation, or other desirable qualities thereby reducing manufacturing and construction costs and/or providing better construction. My invention also provides a backing or form for floors, thereby eliminating the necessity for pans, domes, shoring, feathering, dropping or other expedients necessary with ordinary methods.

In using plastic materials, such as cement, plaster, and the like, reticulated metallic fabric such as woven wire or metallic lath is frequently employed to retain and/or to reinforce the plastic material during the time it is hardening and/or to strengthen it after it has hardened.

In such constructions a backing often is provided for furnishing a surface to which plastic material readily adheres while in the plastic state for determining the thickness of the applied plastic material while yet in its plastic state and/or at the same time furnishing fireproofing, sound-deadening, waterproofing, insulating and/or other qualities.

The pressure of the backing tends to prevent cracking after the material has hardened. In order to secure the fabric to the backing, various expedients have heretofore been employed, such as weaving wires back and forth through the backing and over the strands or through the openings or perforations in the fabric or metal lath, cutting openings in the backing, and passing the upturned edge of the fastening device therethrough, etc.

Such constructions require the use of elaborate machinery for inter-weaving the wires and for pressing the fastening devices through the openings in the backing. In all such devices, the presence of a series of aligned openings in the backing impairs the strength and permits a material amount of the plastic material to pass therethrough during the plastering or surfacing operations.

I provide a fastening means for securing the backing and fabric that is characterized by the use of individual fasteners, each of which is provided with a shank portion that extends through a single closely fitting opening in the backing. The size of the openings are such that they do not materially impair the strength of the backing and furthermore permit little if any of the plastic material to pass therethrough. The individual fasteners are preferably provided with a large head that is disposed on the face of the backing remote from the fabric and are pressed through the backing and extend through a sufficient distance to engage the strands of the fabric. The depth or thickness of the plastic material beneath the fabric may be varied by increasing or decreasing the length of the fastener shank. The outer ends of the individual fasteners are preferably bent or clenched over the strands of the fabric. For certain uses it is desirable that the individual fasteners be made hollow in order that tie wires can be passed therethrough for tying or fastening the base for plastic materials to beams, columns and the like.

By means of my invention I am able to provide a base for plastic material that is constructed of fabric and a backing sheet of paper, tin, fiber or other material obtainable as commercial articles in the open market, thereby accomplishing a material saving in cost by eliminating the necessity for securing specially prepared raw material and subjecting it to further preparation during the manufacture of the base.

Base for plastic materials, as herein referred to, is taken in the usual sense in which it is used in the building and construction trade. The plastic materials referred to are those such as plaster, stucco, concrete, and other like materials applied in a plastic state, by pouring, spreading, spraying, or troweling, to form the surface of interior and outside walls, ceilings, floors, and like members in construction operations. The base is that part of the construction to, over, or through which such plastic material is directly applied and which acts as a retainer, reinforcement, and/or form during and after the drying or curing state of such plastic materials.

In the accompanying drawings, there is illustrated a present preferred form of my invention in which Figure 1 is a plan view of a retainer for plastic material embodying my invention;

Figure 2 is a view, partially in elevation and partially in section, taken along the section line II—II of Figure 1;

Figure 3 is a view taken along the section line III—III of Figure 1;

Figure 4 is a view, similar to Figure 2, showing the retainer after the plastic material has been applied;

Figure 5 is a view similar to Figure 1, showing the application of my invention to metallic lathing;

Figure 6 is a view, similar to Figure 1, showing the use of a hollow fastening means;

Figure 7 is a plan view showing the application to metallic lathing of the fasteners shown in Figure 6;

Figures 8, 9, 10 and 11 are views showing the application of tie wires for securing my retainer to different forms of supporting members;

Figure 12 is a perspective view of a hollow fastener;

Figure 13 is a sectional view showing the application of my invention to metallic studding, joists, beams, girders, angles, channels, or other wood or metal lumber framing and other similar construction.

Figure 14 is a view showing a modification of my invention in which the base is supported by metallic stands; and Figure 15 is a perspective view of a solid fastener.

Referring particularly to Figures 1 to 4 and 15, I have shown a reticulated metallic fabric 2 that is constituted of a number of cross strands 5 and 6 of wire that are secured at their points of intersection by welding and sheet backing 7, preferably of commercial forms of paper or other materials. As shown in Figure 1, the area of the backing 7 can be less than the area of the metallic fabric 2 in order that the ends and sides of adjacent fabrics 2 may be overlapped to provide strong joints without unnecessarily overlapping the backings 7.

In order to secure the backing 7 to the fabric 2, I provide a number of fasteners 8, shown in detail in Figure 15. Each fastener comprises a large head 9 and a shank 10 that may be bent around either of the cross wires 5 or 6 and/or welded thereto, as is shown in Figures 2, 3 and 4. The fasteners 8 are preferably forced through the backing 7 in order that the openings made therein shall be closely fitting to the shanks 10. By reason of the relatively small area of the openings formed in the backing 7 by the shanks 10, the strength of the backing 7 is not materially diminished. Referring to Figure 4, the depth of the plastic material 11 between the fabric 2 and the backing 7 may be varied by increasing or decreasing the length of the shanks 10.

Referring to Figure 5, I have shown the application of the fastener 8 for securing a standard form of metallic lath 14 to a backing 7. In this form of my invention, the ends of the shanks 10 are turned over an element of the lathing in substantially the same manner as shown in Figures 1 to 4. By securing a backing 7 to a metallic lathing 14, it is possible to make the openings 15 therein of such size that a sufficient amount of plastic material may be forced therethrough to completely surround the lath 14 and thereby prevent it from rusting out from the rear. Difficulty has heretofore been experienced in completely enclosing the lath 14 and at the same time keeping the openings 15 small enough to retain the plastic material before hardening. By the use of the backing, it is possible to materially increase the size of the openings 15 and, at the same time, prevent the plastic material from falling away from the lath.

Referring to Figures 6, 7 and 12, I have shown a modified fastener 17 that is provided with a head 18, a shank 19 and a lip 20. A longitudinally disposed opening 21 extends through the shank 19 and head 18 for the reception of a tie wire 22 or a nail. If a nail is driven through the shank, the fabric and backing will still be spaced the length of the shank 19, and not be brought together as may happen when an ordinary nail is used to secure the base. In this form of my invention, the hollow shank 19 is passed through the backing 7 and the lip 20 is turned over the cross wires 5 or 6 or the lath 14, in accordance with the type of fabric being employed.

Referring to Figure 8, I have shown the manner of securing the base by means of a tie wire 22 to a T-beam 24 that cooperates with insulating blocks 25. In Figure 9, the T-beam 24 is disposed above an insulating slab 26.

In Figure 10 I have shown a method of securing the base by means of a tire wire 22 around an I-beam 27 and in Figure 11 I have shown a method of securing the base by means of a tie wire 22 around a metal lumber beam. In all of these applications of my invention, the tie wire 22 is passed through at least two of the fasteners 18 disposed on opposite sides of the beam. By reason of the openings 21 in the fasteners 18, the tie wires pass through the backing 7 in a single opening and are prevented from tearing the fabric 7 by the shanks 19. Heretofore, such tie wires, being of relatively small diameter, have had a distinct tendency to saw or tear through the backings.

Referring to Figure 13, I have shown the application of my invention to metallic studding, I or T-beams, joists, girders, angles, channels or other similarly shaped building members. A wire or other fastener of hard metal 29 is crimped over the flange of the beam, girder or other like member 28 and the shank 10 projecting from the fastener is bent or clenched about 5 or 6 of the metal fabric 2. This shank 10 can be of such length as to secure the desired distance between the metal fabric 2 and the backing 7. While Figure 13 illustrates the type of fabric shown and described in Figure 1, it is obvious that any other type of fabric may be secured in a similar manner.

Referring to Figure 14, I have shown a form of my invention in which a fabric 2 may be supported by metallic strands 30 by fasteners 31, the ends 32 of which may be secured, as by welding or by crimping, or by both, to the strand 30 and the fabric 2.

Accordingly, I have provided a base for plastic materials characterized by the use of standard reticulated fabric and standard commercial backing material without subjecting either of them to further preparation. The fabric and backing are secured together by fastening means, each of which extends through a single closely fitting opening in the backing and engages an element of the reticulated fabric. By providing relatively small openings in the backing 7 I do not materially diminish its strength. The fasteners may be provided with large heads that bear against the edge of the backing remote from the fabric for affording a large engaging surface between the head and the backing.

By providing a relatively close fit between the backing and the fasteners extending therethrough, I prevent the wasting of the plastic material by reason of its passing through the openings heretofore provided for the fastening means.

By reason of the foregoing construction, I am able to provide a base for plastic materials, such as cement, plaster, stucco and the like, that may be used for a wide variety of purposes, such as in walls, floors and ceilings, with a material reduction in cost and/or an increase in strength.

It is to be understood that various changes may be made in the invention without departing from the scope of the appended claims.

I claim:

1. In a base for plastic materials, a fabric, a backing, and means for securing the fabric and backing comprising a member having a shank and a head, the shank extending through a tightly fitting hole in the backing with the head engaging the surface of the backing remote from the fabric.

2. In a base for plastic material, a fabric, a backing, and means for securing the fabric and backing comprising a plurality of members, each having a shank and a head, the shanks extending through tightly fitting holes in the backing with the outer surface of the shank engaging the surface of the backing remote from the fabric.

3. In a base for plastic material, a fabric, a backing, and means for securing the fabric and backing comprising a member having a hollow shank and a head, the shank extending through a tightly fitting hole in the backing with the head engaging the surface of the backing remote from the fabric.

4. In a base for plastic material, a fabric, a backing, and means for securing the fabric and backing comprising a plurality of separate spaced members, each having a hollow shank and a head, the shanks extending through tightly fitting holes in the backing with the outer surface of the shank engaging the surface of the backing remote from the fabric.

5. In a base for plastic material, a reticulated metallic fabric comprising a plurality of interconnected members, a backing, and means for connecting the fabric and backing comprising a plurality of members, each having a head bearing against a face of the backing remote from the fabric and a shank portion extending through a closely fitting hole in the backing and engaging a member of the fabric.

6. In a base for plastic material, a reticulated metallic fabric comprising a plurality of interconnected members, a backing, and means for connecting the fabric and backing comprising a plurality of members, each having a head bearing against a face of the backing remote from the fabric and a shank portion extending through a closely fitting hole in the backing and encircling at least a portion of a member of the fabric.

7. In a base for plastic material, a reticulated metallic fabric comprising a plurality of interconnected members, a paper backing, and means for connecting the fabric and backing comprising a plurality of members, each having a head bearing against a face of the backing remote from the fabric and a shank portion extending through a closely fitting hole in the backing and engaging a member of the fabric.

8. In a base for plastic material, a fabric, a backing, securing means for the fabric and backing, each comprising a hollow shank extending through a closely fitting hole in the backing, the shanks being adapted for the passage of a securing device therethrough.

9. In a base for plastic material, a fabric, a backing, and securing means for the fabric and backing comprising a cylindrical portion for the insertion of securing means extending through a closely fitting opening in the backing.

10. In a base for plastic material, a reticulated metallic fabric, a backing member, and securing means therefor comprising a plurality of members, each extending through a single tightly fitting hole in the backing, whereby the strength of the base is substantially undiminished by the presence of the securing means.

11. The combination with a metallic support, of a base for plastic material comprising a fabric, a backing and a fastener for the fabric and backing having means for securing it to the metallic support.

12. The combination with a supporting element having an outwardly projecting edge, of a base for plastic material comprising a fabric, a backing, and a fastener for the base having clinchable means for engaging the edge of supporting element.

13. The combination with a supporting element, of a base for plastic material comprising a fabric, a backing and a fastening means comprising a metallic member having means for gripping the supporting element, extending through the backing, and engaging the fabric.

14. In a base for plastic materials, a fabric, a backing, and means for securing the backing to the fabric comprising a plurality of members each of which engages the fabric and passes but once substantially perpendicularly through the backing and terminates in means for engaging the surface of backing opposite the fabric.

15. In a base for plastic materials, a fabric, a backing, and means for securing the backing to the fabric comprising a plurality of means for securing the backing to the fabric each of which comprises a separate unit extending through the backing in a single hole and engaging the fabric adjacent to the opening in the backing through which it passes.

16. In a base for plastic materials, a fabric, a backing and means for securing the backing to the fabric comprising a plurality of means each of which comprises a separate unit extending through the backing in substantially a single effective opening and engaging the fabric adjacent to the opening in the backing through which it passes.

17. In a base for plastic material, a fabric, a backing, and a plurality of separate spaced securing means for securing the fabric and backing, each means extending through a single opening in the backing.

18. In a base for plastic material, a fabric, a backing and a plurality of separate spaced posts for securing the fabric and backing together, each post extending through a separate opening in the backing.

19. In a base for plastic materials, a fabric, a backing, and means for securing the backing to the fabric comprising a plurality of members each of which engages the fabric and passes but once through the backing and terminates in means for engaging the surface of the backing opposite the fabric.

In testimony whereof I have hereunto set my hand.

GEORGE ELMER LAND.